July 17, 1951

E. H. HUGENHOLTZ

CIRCUIT ARRANGEMENT COMPRISING AN OSCILLATOR AND A REACTANCE TUBE

Filed Sept. 30, 1948

2,561,056

INVENTOR.
EDUARD HERMAN HUGENHOLTZ
BY
ATTORNEY.

Patented July 17, 1951 2,561,056

UNITED STATES PATENT OFFICE 2,561,056

CIRCUIT ARRANGEMENT COMPRISING AN OSCILLATOR AND A REACTANCE TUBE

Eduard Herman Hugenholtz, Eindhoven, Netherlands, assignor to Hartford National Bank and Trust Company, Hartford, Conn., as trustee Application September 30, 1948, Serial No. 52,083
In the Netherlands October 13, 1947

4 Claims. (Cl. 250—36)

Figure 1:
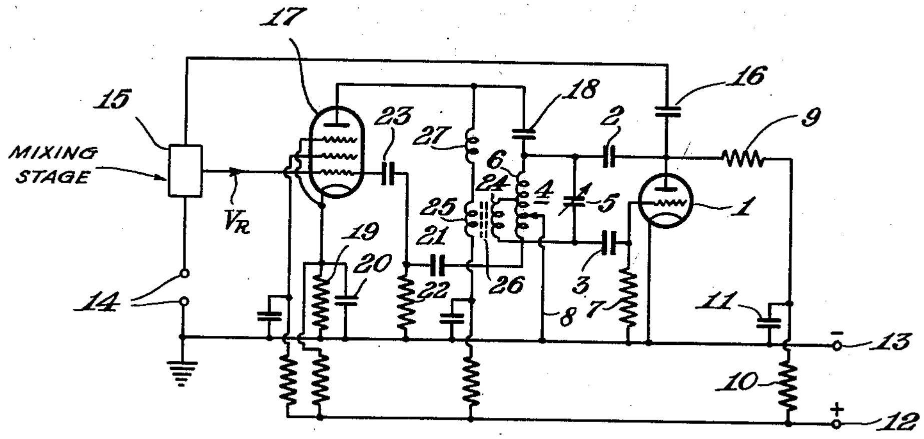

For automatic frequency correction (AFC) or for frequency modulation of the oscillations produced by an oscillator it is known to use circuit-arrangements in which the frequency-determining oscillatory circuit of the oscillator has coupled with it an idly back-coupled, grid-controlled amplifying tube and in which the control-grid of this amplifying tube has applied to it a control-voltage which is proportional to the frequency difference to be corrected or to the modulating voltage. Such an idly back-coupled amplifying tube, or else a reactance tube, acts as a reactance the value of which varies with the control-voltage applied to the control-grid.

If a great control sensitiveness is required, such a reactance tube only permits of realizing a small control-range. In order to obviate this disadvantage, it has already been suggested, for example, for automatic frequency correction, to use, in addition to the reactance tube, other means by which a larger control-range is obtained with lower sensitiveness and accuracy. However, with the known devices such an additional AFC circuit essentially comes down to duplicating the device.

Efforts have furthermore been made by the applicant to realize with several known AFC circuits a great sensitiveness together with a large control-range. It was found, however, that instability phenomena invariably occurred in this case, whilst it was sometimes difficult to ensure synchronization, all this being due to inertias in the control-circuit.

The invention has for its object to provide a simpler solution which may also be applied to frequency-modulation circuit-arrangements.

According to the invention, when using a reactance tube, the frequency-determining oscillatory circuit of the oscillator has coupled to it an additional, variable reactance the value of which is controlled by the direct output current of an output electrode of the reactance tube.

When carrying out the invention, the variation in the direct-current position, for example the screen-grid current, of the reactance tube upon variation in the control-voltage, is thus utilized to ensure an additional frequency variation, whereas in the known circuit-arrangements use was only made of the variation in the apparent alternating-current resistance of the reactance tube connection.

It may be observed here that for AFC purposes or for frequency modulation it is known per se to utilize the variation in the internal resistance of a grid-controlled amplifying tube upon variation of the control-grid bias. An amplifying tube employed in such manner is commonly referred to as a control tube. According to the present invention, a reactance tube is thus utilized also as a control-tube. It is not inconvenient in this case, more particularly with the use for AFC purposes, when the control-velocities of the reactance tube circuit and of the circuit in which the reactance tube is active as a control-tube differ materially.

It is advantageous to build up the circuit-arrangement according to the invention in such manner that for a given variation in the control-voltage fed to the control-grid of the reactance tube the extent of detuning of the oscillator owing to the reactance tube being active as a control tube exceeds the extent of detuning due to the action of the reactance tube as a variable reactance. The control-tube circuit may then be, for example, the circuit operating comparatively slowly.

In an advantageous embodiment of the circuit-arrangement according to the invention the frequency-determining circuit of the oscillator comprises a coil having an iron core which is provided with a premagnetizing winding which is included in the direct anode current circuit of the reactance tube.

Figure 2:
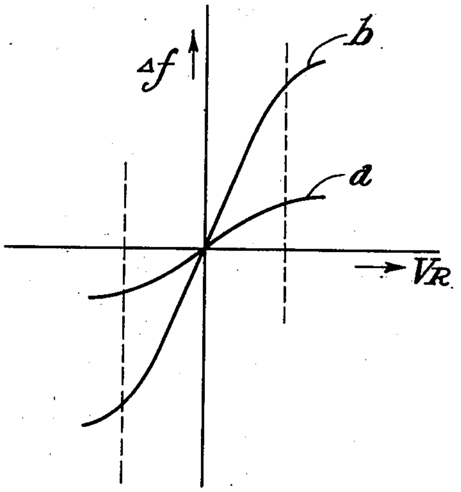

In order that the invention may be more clearly understood and readily carried into effect, it will now be described more fully with reference to the accompanying drawing, in which Figs. 1 and 2 show an AFC circuit according to the invention and a diagram to explain the operation of the circuit respectively.

Referring to Fig. 1, reference numeral 1 designates a triode which is used as an oscillator tube and of which the anode and control-grid are connected through coupling condensers 2 and 3 respectively to different ends of the frequency-determining circuit 4, comprising a tuning condenser 5 and a circuit coil 6. The cathode is earthed directly and the control-grid through a resistance 7, whilst a tapping on the circuit coil 6 is also earthed through a lead 8. The anode of the triode 1 is connected through a choke 9 and a resistance-condenser circuit 10, 11 serving for smoothing to the positive terminal 12 of an anode voltage source, of which the negative terminal 13 is earthed.

The control-voltage required for frequency correction of the oscillations produced by the oscillator 1—6 on control-oscillations fed to connecting terminals 14 is taken from a discriminator, for example a comparative discriminator. This discriminator, which is diagrammatically shown in the figure at 15, and to which the control-oscillations 14 are fed directly and the oscillator voltage through a coupling condenser 16, produces a control-voltage of which the value and polarity vary with the value and polarity of the required frequency correction.

The control-voltage $V_r$ produced across the output circuit of the mixing stage 15 is fed to the control-grid of a pentode 17 which is connected as a reactance tube. For this purpose the anode of this tube is connected through a coupling condenser 18 to one end of the frequency-determining oscillatory circuit 4 of the oscillator 1—6, whereas the cathode is connected to a tapping point on a potentiometer 19, which is connected in parallel to the anode voltage source and earthed through a condenser 20. The control-grid of the reactance tube 17 has fed to it a voltage taken from the frequency-determining circuit 4 of the oscillator 1—6, through a phase-shifting network formed by a condenser 21 and a resistance 22. The tapping point of this network is capacitively (23) coupled to the control-grid of the reactance tube 17.

Circuit-arrangements of the kind hitherto described are known per se; it should therefore only be noted that in such a circuit-arrangement the reactance tube is active as a reactance connected in parallel to the frequency-determining circuit and of which the value is controlled by the control-voltage in such manner that there is synchronism between the control-oscillation and the oscillation produced by the oscillator 1—6. However, between the two synchronized oscillations subsists a phase-shift, of which the value and polarity vary with the value and polarity of the frequency correction produced.

In Fig. 2 a curve *a* shows the frequency correction as a function of the control-voltage produced. The maximum obtainable frequency correction is comparatively small.

According to the invention, in the circuit-arrangement shown in Fig. 1 an additional frequency correction is produced by using the reactance tube at the same time as a control-tube. For this purpose a control coil 24 is coupled to the frequency-determining oscillatory circuit of the oscillator 1—6. It is connected in parallel to part of the circuit coil 6 and arranged, jointly with a pre-magnetizing winding 25, on a core of powdery iron 26. The inductance of the coil 24 is variable by control of the pre-magnetization of the core 26. For this purpose the pre-magnetizing winding is included in series with a decoupling choke 27 in the anode current circuit of the tube 17.

Variation in the control-voltage $V_r$ applied to the control-grid of the tube 17 has the effect of varying the direct anode current and, consequently, the inductance of the control coil 24, which results in a variation in the tuning of the frequency-determining circuit 4. Provided that the polarity of variation in the inductance of the control coil 24 is correctly chosen, the frequency correction produced by the control-coil assists the frequency correction produced by the reactance tube in itself. The frequency correction produced by the exclusive control-tube action of the tube 17 is shown in Fig. 2 as a function of the control-voltage by curve *b*. This control-curve extends through a larger frequency range than the curve *a*; it should, however, be considered that the control-tube connection in itself reduces the frequency difference between the control- and the oscillator oscillations, it is true, but does not bring about a control which ensures exact synchronism. Moreover, the control of the inductance of the coil 24 is attended with a certain inertia, so that the control-tube connection in itself is not capable of following up rapid variations in the control-voltage. However, this is not inconvenient when using the circuit-arrangement described, comprising a reactance tube which is also active as a control-tube, since, as a rule, great frequency variations require a smaller control-velocity than small frequency variations.

As a matter of course, any arbitrary control-impedance known per se may be used as an additional control-impedance controlled by the control-tube. Use may, for example, be made of a voltage-dependent condenser, which has applied to it a control-voltage which is taken from a resistance included in the anode current circuit of the tube 17.

If desired, the direct anode current of the tube 17 may also be used to control the direction of rotation of a motor, which adjusts a control-condenser included in the frequency-determining circuit 4 in such manner that the frequency difference between the control- and oscillator oscillations is reduced. If the control-oscillations temporarily drop out, for example owing to fading effects, the oscillator frequency varies to a smaller extent than would be the case when using solely a reactance tube connection.

When the circuit-arrangement shown is used for frequency modulation of the oscillations produced by the oscillator 1—6, the modulating voltage instead of the control-voltage $V_r$ is fed as a control-voltage to the control-grid of the reactance tube.

What I claim is:

1. An electrical circuit arrangement for generating a wave having a frequency dependent on the magnitude and polarity of an applied signal, comprising oscillator means having a frequency-determining resonant circuit with a given resonant frequency, a reactance tube device including an electron discharge tube having cathode, grid and output electrodes, means to couple said reactance tube device to said resonant circuit, means to apply said signal to said reactance tube device to vary the reactance of said device thereby to vary the resonant frequency of said resonant circuit in accordance with variations in the magnitude and polarity of said applied signal, and an impedance network having a reactance value proportional to current flow to the said output electrode of said electron discharge tube intercoupling the said output electrode and said resonant circuit to further vary the resonant frequency of said resonant circuit in accordance with the variation in the magnitude and polarity of said applied signal.

2. An electrical circuit arrangement for generating a wave having a frequency dependent on the magnitude and polarity of an applied signal, comprising oscillator means having a frequency-determining resonant circuit with a given resonant frequency, a reactance tube device including an electron discharge tube having cathode, grid and output electrodes, means to couple said reactance tube device to said resonant circuit, means to apply said signal to the grid of said tube to vary the reactance of said device thereby to vary the resonant frequency of said resonant circuit in accordance with variations in the magnitude and polarity of said applied signal, and an inductive element having a reactance value proportional to the current flow to the said output electrode of said electron discharge tube coupled to said resonant circuit to further vary the resonant frequency of said resonant circuit in accordance with the variations in the magnitude and polarity of said applied signal.

3. An electrical circuit arrangement for generating a wave having a frequency dependent on the magnitude and polarity of an applied signal, comprising oscillator means having a frequency-determining resonant circuit with a given resonant frequency, a reactance tube device including an electron discharge tube having cathode, grid and output electrodes, means to couple said reactance tube device to said resonant circuit, means to apply said signal to the grid of said discharge tube to vary the reactance of said device thereby to vary the resonant frequency of said resonant circuit in accordance with variations in the magnitude and polarity of said applied signal, and an inductive element having a ferromagnetic core and being coupled to said resonant circuit, said core being provided with a premagnetizing winding coupled to said output electrode of said discharge tube to vary the reactance of said inductive element in accordance with current flow to said output electrode of said electron discharge tube thereby to further vary the resonant frequency of said resonant circuit in accordance with the variations in the magnitude and polarity of said applied signal.

4. An electrical circuit arrangement for generating a wave having a frequency dependent on the magnitude and polarity of an applied signal, comprising oscillator means having a frequency-determining resonant circuit with a given resonant frequency and including a tapped inductive element, a reactance tube device including an electron discharge tube having cathode, grid and output electrodes, means to couple said reactance tube device to said resonant circuit, means to apply said signal to the grid of said discharge tube to vary the reactance of said device thereby to vary the resonant frequency of said resonant circuit in accordance with variations in the magnitude and polarity of said applied signal, and an inductor having a ferromagnetic core connected between the tapping and one end of said inductive element, said core being provided with a premagnetizing winding coupled to the output electrode of said discharge tube to vary the reactance of said inductive element in accordance with variations in magnitude of the current flow to the said output electrode of said electron discharge tube thereby to further vary the resonant frequency of said resonant circuit in accordance with the variations in the magnitude and polarity of said applied signal.

EDUARD HERMAN HUGENHOLTZ.

REFERENCES CITED

The following references are of record in the file of this patent:

UNITED STATES PATENTS

| Number | Name | Date |
|---|---|---|
| 2,144,235 | Travis | Jan. 17, 1939 |
| 2,422,082 | Crosby | June 10, 1947 |
| 2,441,504 | O'Brien | May 11, 1948 |